(12) United States Patent
Mullaney et al.

(10) Patent No.: US 8,005,333 B2
(45) Date of Patent: Aug. 23, 2011

(54) TAP-OFF CLOSURE SYSTEMS AND METHODS FOR USING THE SAME

(75) Inventors: Julian Mullaney, Raleigh, NC (US);
William Alan Carrico, Raleigh, NC (US); Justin Everette Thompson, Angier, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 317 days.

(21) Appl. No.: 12/468,551

(22) Filed: May 19, 2009

(65) Prior Publication Data

US 2009/0290844 A1 Nov. 26, 2009

Related U.S. Application Data

(60) Provisional application No. 61/054,628, filed on May 20, 2008.

(51) Int. Cl.
*G02B 6/00* (2006.01)
*H02G 3/08* (2006.01)
(52) U.S. Cl. .......................... 385/135; 174/50; 385/147
(58) Field of Classification Search .................. 385/134, 385/135, 136, 138, 139, 147; 174/50, 58, 174/64

See application file for complete search history.

(56) References Cited

U.S. PATENT DOCUMENTS

| 5,235,665 | A | 8/1993 | Marchesi et al. | |
|---|---|---|---|---|
| 6,829,424 | B1 | 12/2004 | Finzel et al. | |
| 7,356,237 | B2 | 4/2008 | Mullaney et al. | |
| 7,837,396 | B2 * | 11/2010 | Marcouiller | 385/84 |
| 7,889,961 | B2 * | 2/2011 | Cote et al. | 385/135 |
| 2004/0170369 | A1 | 9/2004 | Pons | |
| 2005/0207711 | A1 | 9/2005 | Vo et al. | |
| 2010/0054687 | A1 * | 3/2010 | Ye et al. | 385/135 |

* cited by examiner

*Primary Examiner* — Akm Ullah
(74) *Attorney, Agent, or Firm* — Myers Bigel Sibley & Sajovec, PA (57) ABSTRACT

A fiber optic cable connection assembly includes an enclosure housing and a fiber optic cable. The enclosure housing defines a chamber and a fiber handling region disposed in the chamber. The fiber optic cable has a lengthwise cable axis and including a plurality of cable optical fibers, a jacket surrounding the cable optical fibers and a strength member extending through the jacket. The cable includes an arcuately bent cable segment disposed in the chamber. The bent cable segment defines a cable plane and an interior region within the arc of the bent cable segment. At least one of the cable optical fibers extends fully through the enclosure housing uncut. The strength member extends fully through the enclosure housing uncut. The fiber handling region is disposed in the interior region. At least one of the cable optical fibers is removed from the bent cable segment and routed into the fiber handling region where at least a portion of the removed cable optical fiber is stored and/or spliced to another optical fiber.

20 Claims, 10 Drawing Sheets

TAP-OFF CLOSURE SYSTEMS AND METHODS FOR USING THE SAME

RELATED APPLICATION(S)

The present application claims the benefit of U.S. Provisional Patent Application No. 61/054,628, filed May 20, 2008, the disclosure of which is hereby incorporated herein by reference in its entirety.

BACKGROUND OF THE INVENTION

The present invention relates to communication cable termination systems and, more particularly, to optical fiber termination systems and methods for terminating the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location, for example. A trunk or main cable may be routed, for example, through a housing subdivision and small fiber count "drop cables" may be spliced to the main cable at predetermined spaced apart locations.

A typical main cable may be installed underground and have multiple drop cables connected thereto, each of a hundred feet or more. Each of the drop cables, in turn, may be routed to an optical network unit (ONU) serving several homes. Information may then be transmitted optically to the ONU, and into the home, via conventional copper cable technology, although it also has been proposed to extend optical fiber all the way to the home rather than just to the ONU. Thus, the drop cables may serve groups of users, although other architectures may also employ a main cable and one or more drop cables connected thereto.

SUMMARY OF THE INVENTION

According to embodiments of the present invention, a fiber optic cable connection assembly includes an enclosure housing and a fiber optic cable. The enclosure housing defines a chamber and a fiber handling region disposed in the chamber. The fiber optic cable has a lengthwise cable axis and includes a plurality of cable optical fibers, a jacket surrounding the cable optical fibers and a strength member extending through the jacket. The cable includes an arcuately bent cable segment disposed in the chamber. The bent cable segment defines a cable plane and an interior region within the arc of the bent cable segment. At least one of the cable optical fibers extends fully through the enclosure housing uncut. The strength member extends fully through the enclosure housing uncut. The fiber handling region is disposed in the interior region. At least one of the cable optical fibers is removed from the bent cable segment and routed into the fiber handling region where at least a portion of the removed cable optical fiber is stored and/or spliced to another optical fiber.

In some embodiments, the fiber handling region is located in a fiber handling plane spaced apart from the cable plane.

According to some embodiments, the jacket extends fully and continuously through the enclosure housing. The jacket includes a longitudinally extending access opening in the bent cable segment and in the chamber and through which the cable optical fibers exit the jacket. The access opening may face in a direction opposite the interior region.

The fiber optic cable connection assembly may further include a secondary optical fiber extending into the chamber, wherein the removed cable optical fiber is routed out of the bent cable segment and spliced with the secondary optical fiber in the fiber handling region. In some embodiments, the fiber optic cable connection assembly includes a splice retainer structure in the fiber handling region to hold a splice between the removed cable optical fiber and the secondary optical fiber. The splice retainer structure can include a splice tray located above the cable plane. According to some embodiments, the enclosure housing and the splice tray define a subchamber therebetween, the cable plane extends through the subchamber, and the secondary optical fiber extends through the subchamber and onto a side of the splice tray opposite the subchamber where the secondary optical fiber is spliced with the removed cable optical fiber.

In some embodiments, the removed cable optical fiber is an express optical fiber extending fully through the enclosure housing uncut.

The fiber optic cable enclosure system may include routing features in the enclosure housing defining a prescribed cable arc path and configured to retain the bent cable segment such that the bent cable segment extends along the cable arc path. In some embodiments, the cable arc path has an arc path radius that is equal to or exceeds a prescribed minimum bend radius of the cable optical fibers.

According to embodiments of the present invention, an enclosure assembly for use with a fiber optic cable and a secondary fiber, the cable having a lengthwise cable axis and including a plurality of cable optical fibers, a jacket surrounding the cable optical fibers and a strength member extending through the jacket, includes an enclosure housing and routing features in the enclosure housing. The enclosure housing defines a chamber to receive the cable. The routing features define a prescribed cable arc path and are configured to retain an arcuately bent cable segment such that the bent cable segment extends along the cable arc path. The bent cable segment includes an uncut length of the strength member and defines a cable plane and an interior region within the bent cable segment. A fiber handling region is disposed in the chamber in the interior region. At least one of the cable optical fibers can be removed from the bent cable segment and routed into the fiber handling region to store at least a portion of the removed cable optical fiber in the fiber handling region and/or to splice the removed cable optical fiber with another optical fiber.

In some embodiments, the fiber handling region is located in a fiber handling plane spaced apart from the cable plane.

In some embodiments, the enclosure assembly includes a splice retainer structure in the fiber handling region to hold a splice between the removed cable optical fiber and a secondary optical fiber.

According to method embodiments of the present invention, a method for enclosing a portion of a fiber optic cable, the cable having a lengthwise cable axis and including a plurality of cable optical fibers, a jacket surrounding the cable optical fibers, and a strength member extending through the jacket, includes: providing an enclosure housing defining a chamber and a fiber handling region disposed in the chamber;

and positioning an arcuately bent cable segment of the cable in the chamber. The bent cable segment defines a cable plane and an interior region within the bent cable segment. At least one of the cable optical fibers extends fully through the enclosure housing uncut The strength member extends fully through the enclosure housing uncut. The fiber handling region is disposed in the interior region. The method further includes: removing at least one of the cable optical fibers from the bent cable segment; routing the removed cable optical fiber into the fiber handling region; and storing at least a portion of the removed cable optical fiber in the fiber handling region and/or splicing the removed cable optical fiber with a secondary optical fiber in the fiber handling region.

In some embodiments, the fiber handling region is located in a fiber handling plane spaced apart from the cable plane.

The method may include: providing a splice retainer structure in the splice region to hold a splice between the selected cable optical fiber and the secondary optical fiber, the splice retainer structure including a splice tray located above the cable plane, wherein the enclosure housing and the splice tray define a subchamber therebetween and the cable plane extends through the subchamber; routing the secondary optical fiber through the subchamber and onto a side of the splice tray opposite the subchamber; and splicing the secondary optical fiber with the selected cable optical fiber on the side of the splice tray opposite the subchamber.

According to some embodiments, the jacket extends fully and continuously through the enclosure housing when the bent cable segment is positioned in the enclosure housing, and the jacket includes a longitudinally extending access opening in the bent cable segment, and removing the at least one cable optical fiber from the bent cable segment includes removing the removed cable optical fiber from the bent cable segment through the access opening.

In some embodiments, positioning the arcuately bent cable segment of the cable in the chamber includes positioning the arcuately bent cable segment of the cable in the chamber such that the access opening of the cable faces in a direction opposite the interior region.

The method may include, prior to positioning the arcuately bent cable segment of the cable in the chamber, removing a scalloped segment of the jacket to form the access opening.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Some embodiments of the present invention provide an enclosure system for use with fiber optic cabling. The enclosure system may make it easier to access and splice fibers running to living units or other customer locations at or near the end of fiber runs.

In some embodiments, the enclosure system includes an enclosure including some and/or all of the following features. The enclosure system may include an enclosure containing entry and/or egress points for fiber optic cables. One entry point may be used for an entering cable (feeder), one may be used for drop cable(s) exit, and a third may be used for exiting feeder (express) cable. The enclosure system may be a multi-drop or tap-off closure.

According to some embodiments of the present invention, a taut sheath, pass through, fiber optic splice butt closure is provided. The butt closure is configured to receive a segment of a fiber optic cable, such that fibers thereof are expressed (uncut) through the closure without severing a strength member or strength members of the cable segment (i.e., one or more of the strength members are expressed through the closure). According to some embodiments of the present invention, an outer protective jacket of the cable segment extends fully and continuously through the closure and has an opening defined therein without being fully severed.

According to some embodiments of the present invention, a closure system is configured to define a cable arc path within an enclosure and retain a segment of a fiber optic cable in the cable arc path. The closure system further defines a location for forming a splice with one or more fibers in the cable segment. The closure system can relatively position a fiber of the cable in the enclosure such that a length of the fiber can be accessed and spliced without requiring that a substantial length of the fiber be axially withdrawn from the cable. Further, the closure system can relatively position a fiber of the cable in the enclosure such that a strain relief device can be applied to an outer protective jacket of the cable without interfering with or damaging the fiber. The strain relief device can separate the fiber from the strength member and outer jacket to reduce the risk of damage to the fiber.

In some embodiments, the location for forming a splice is in an interior region defined within the cable arc path. In some embodiments, one or more structures are provided to flatten and/or route the fiber through the interior region to provide a relatively smooth fiber path. According to some embodiments, the closure system includes a base that prescribes or defines the cable arc path, and further includes a splice tray in the interior region and upon which the fiber may be routed and the splice may be secured.

According to some embodiments, a location for expressing a fiber or fibers (e.g., a ribbon stack) is provided in another plane (which may be referred to herein as the "fiber handling plane") that is spaced apart from a cable plane defined by the arcuately bent cable segment. In some embodiments, one or more structures are provided to route the expressed fiber in the fiber handling plane and/or between the cable plane and the fiber handling plane to provide a relatively smooth fiber path. According to some embodiments, the smooth fiber path ensures that the bend radius of the fiber therein exceeds the minimum bend radius for the fiber to thereby protect the fiber from damage. The closure system may include a transition structure, such as a smoothly contoured scoop to allow uncut express fibers to transition from the cable plane to the fiber handling plane (or vice-versa). According to some embodiments, the closure system includes a base that prescribes the cable arc, and further includes a splice tray in or at the fiber plane and upon which the fiber may be routed and the splice may be secured.

According to some embodiments, the location for forming the splice is both in a fiber splice plane (i.e., the fiber handling plane) that is spaced apart from a cable plane defined by the arcuately bent cable segment and in an interior region defined within the cable arc.

According to some embodiments, the enclosure system includes a strain relief or securing device to engage and secure the cable segment in the enclosure. According to some embodiments, the closure system includes a separator device that isolates an uncut strength member of the cable segment from the fiber. In some embodiments, the separator device and the securing device are the same structure.

According to some embodiments of the present invention, a fiber optic splice enclosure having a cable entrance and a cable exit is configured to position a segment of a fiber optic cable with uncut strength members in an arcuately bent shape. In some embodiments, the closure system includes a fiber splice tray located on a plane spaced apart from a plane in which the bent cable segment resides. According to some embodiments, a scalloped opening is defined in the cable and each strength member extends above or below the scalloped opening. According to some embodiments, the scalloped opening faces outwardly with respect to the cable arc. According to other embodiments, the scalloped opening faces inwardly with respect to the cable arc.

Figure 1:
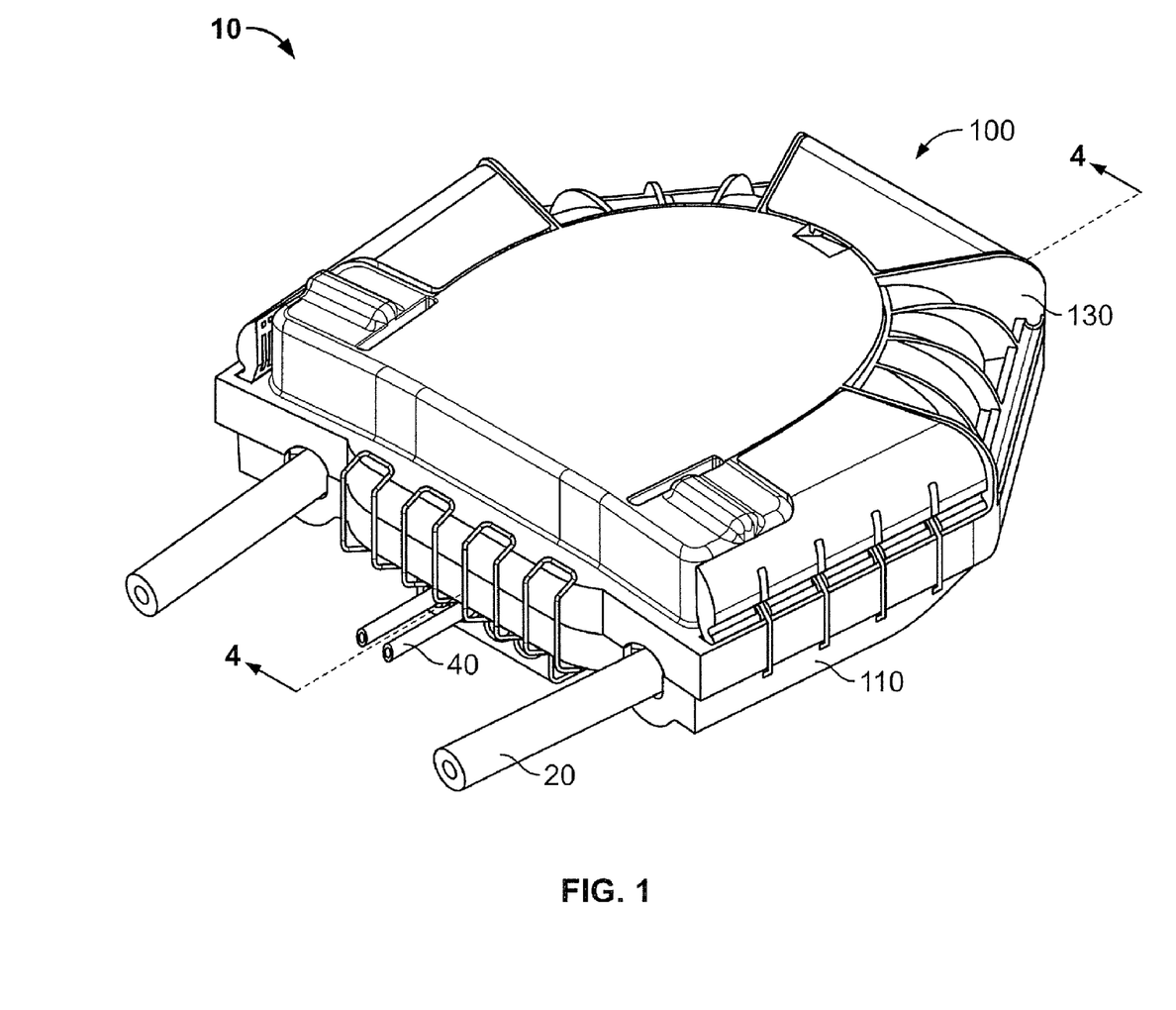
FIG. 1 is a rear, top perspective view of a splice connection assembly according to embodiments of the present invention including an enclosure system.
Figure 3:
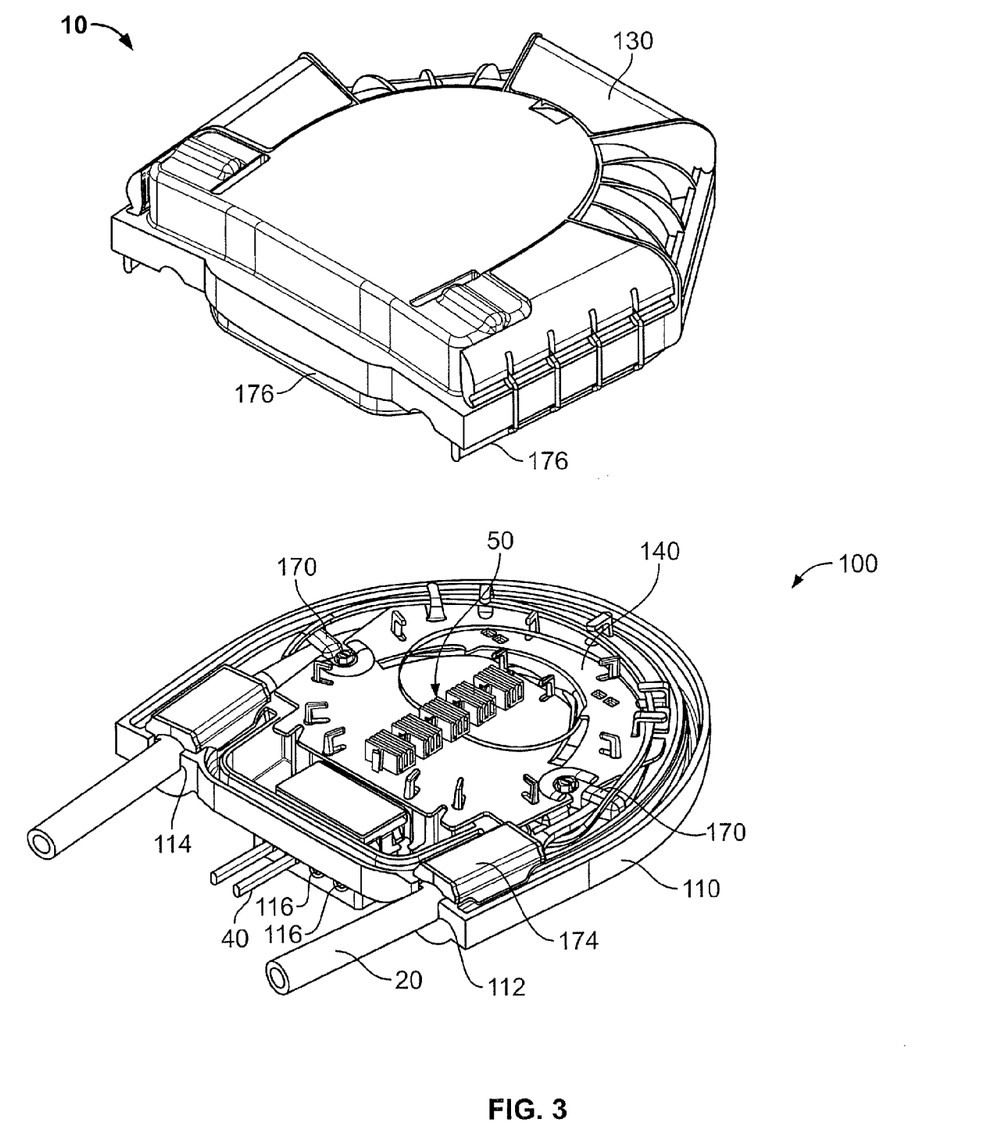
FIG. 3 is a partially exploded, rear perspective view of the splice connection assembly of FIG. 1.
Figure 4:
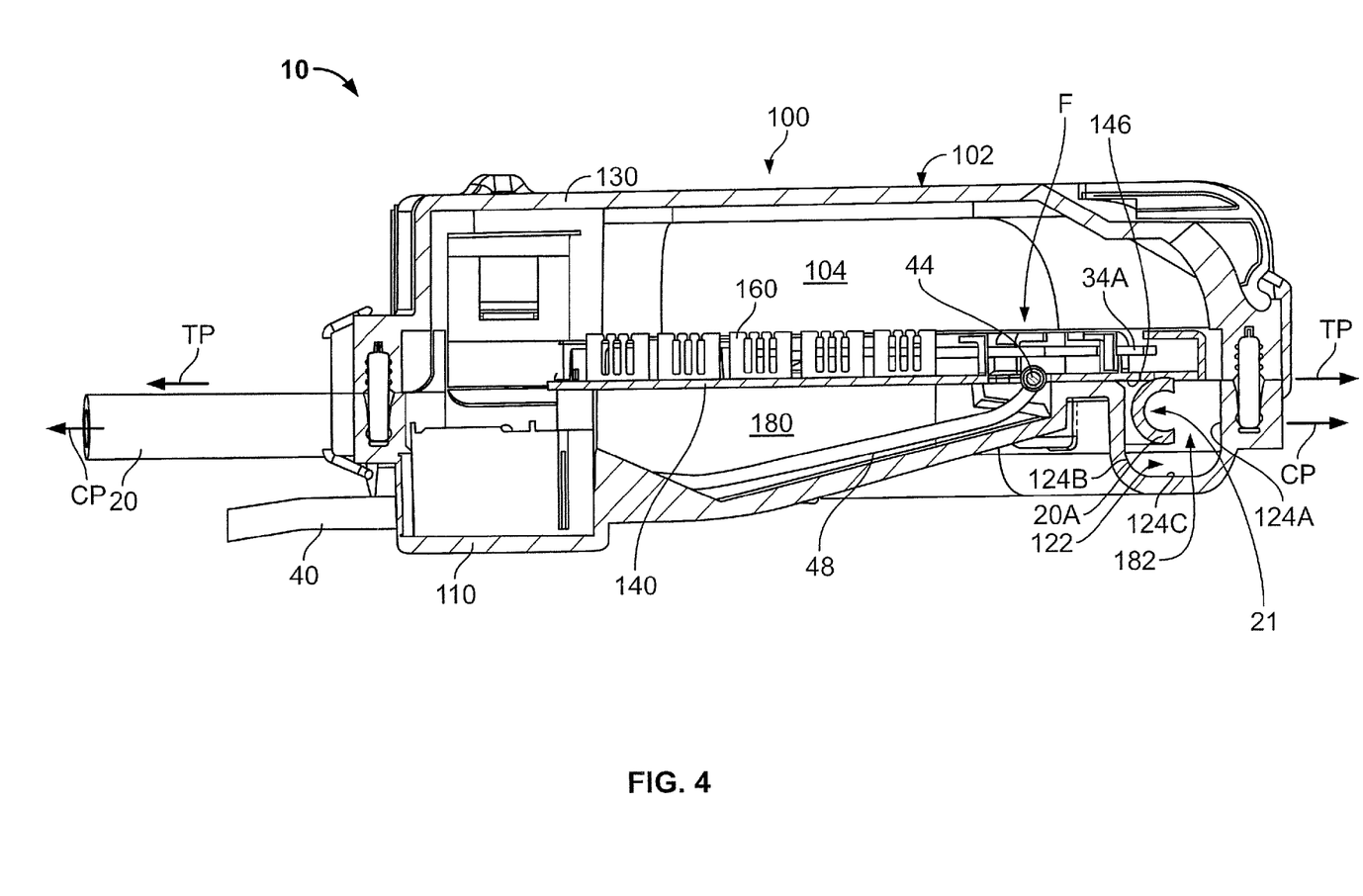
FIG. 4 is a cross-sectional view of the splice connection assembly of FIG. 1 taken along the line 4-4 of FIG. 1.

Embodiments of the present invention will now be further described with reference to FIGS. 1-11. A multi-drop enclosure system 100 for coupling optical fiber drop cables 40 to an optical fiber main cable 20 at a termination point to form a splice connection assembly 10 is shown in FIGS. 1, 3 and 4. The optical fiber main cable 20 may be, for example, a feed from a service provider central office intended to provide service to individual subscriber locations in various locations in the field. The termination point may be positioned in the proximity of a neighborhood or the like and the drop cables 40 may deliver an optical fiber connection to the subscriber location and/or to a junction box or the like where, for example, a copper connection may be routed for the last leg to the subscriber location. The portion of the cable 20 shown in FIG. 1 corresponds to a termination point, where a splice may be made to the main cable 20, and it will be understood that there are typically drop cables spliced to the main cable 20 at a plurality of longitudinally displaced termination points selected to be positioned at desired locations in the field, such as in a neighborhood or the like.

Figure 7:
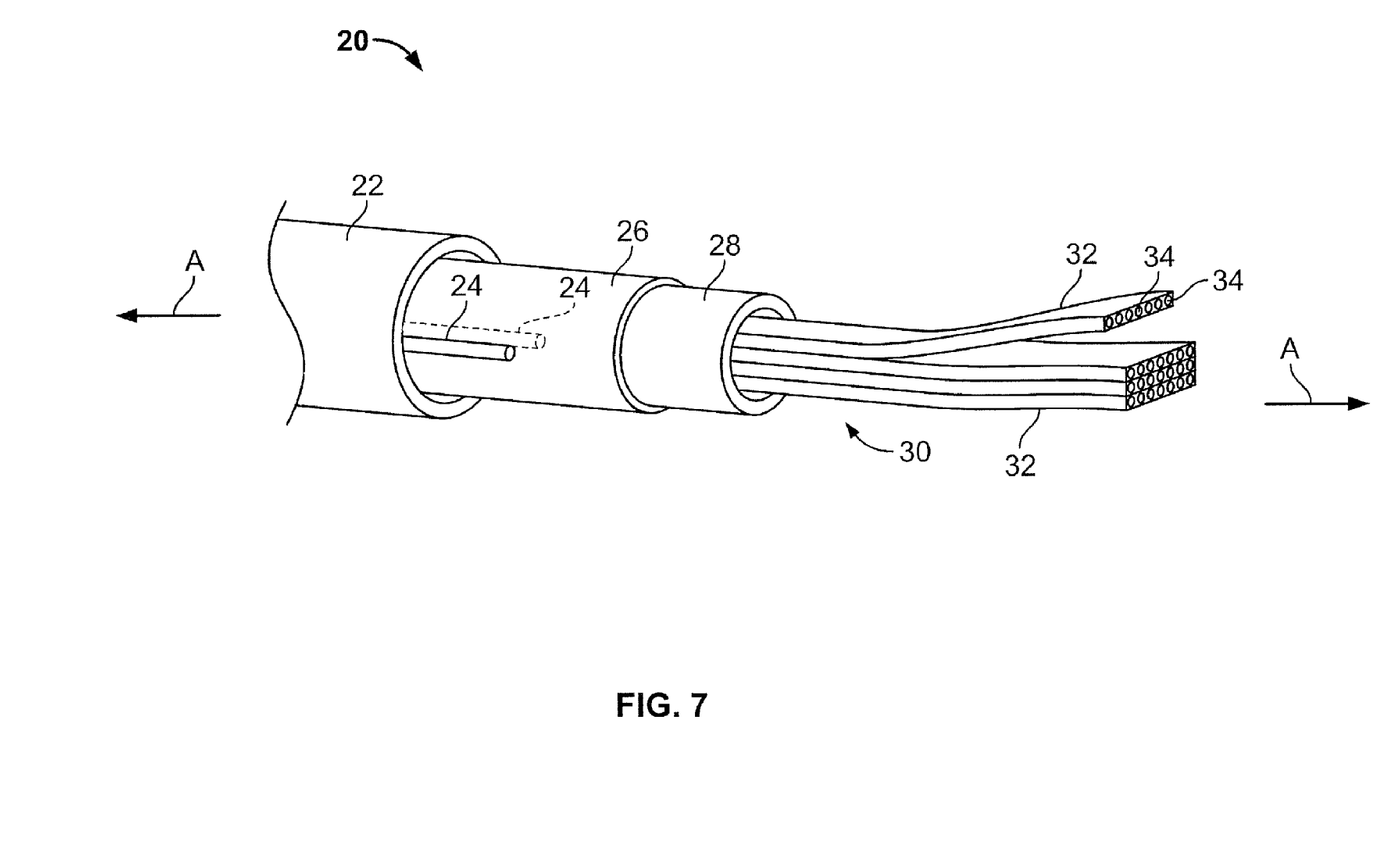
FIG. 7 is a fragmentary, perspective view of a fiber optic cable forming a part of the splice connection assembly of FIG. 1.
Figure 9:
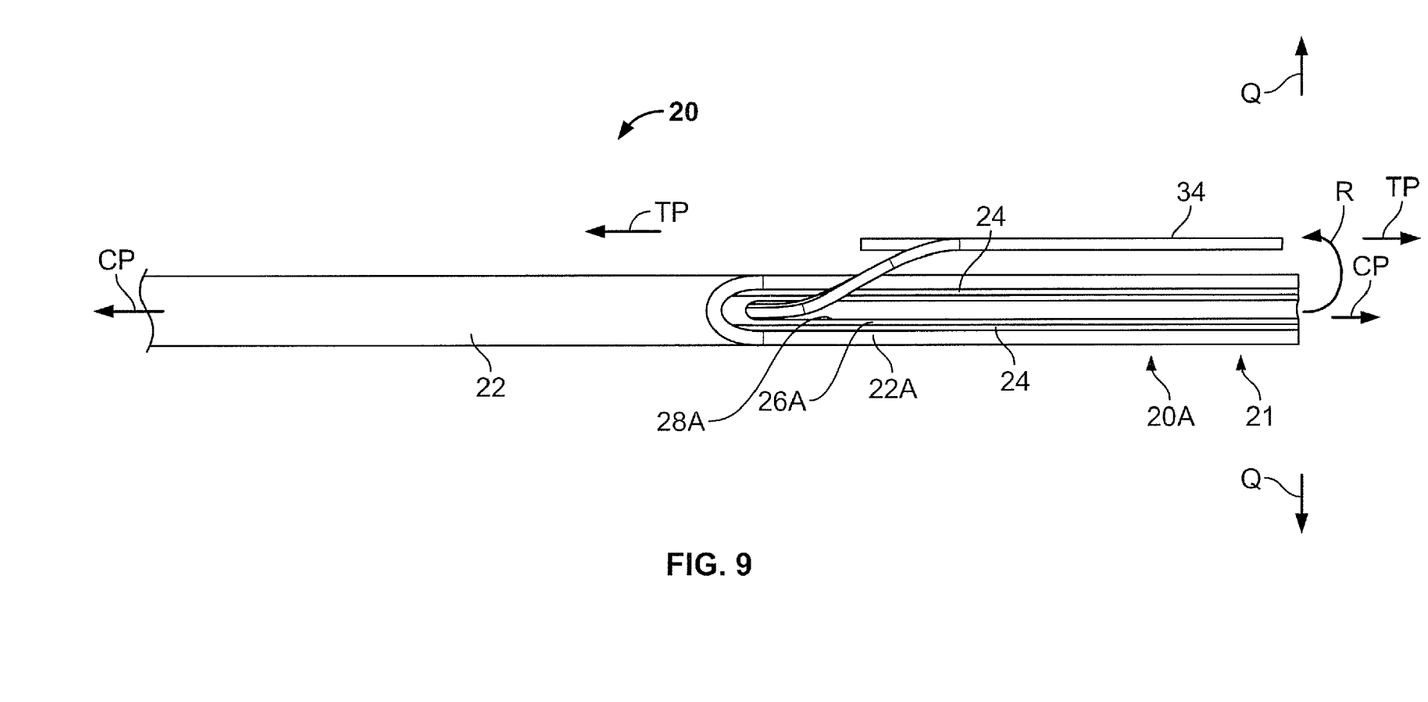
FIG. 9 is a side elevational view of a bent cable segment of the fiber optic cable of FIG. 7.

As shown in FIGS. 7 and 9, the illustrated optical fiber main cable 20 includes an optical fiber ribbon stack 30, a buffer tube 28 surrounding the ribbon stack 30, a tubular metal grounding shield 26 surrounding the buffer tube 28, and a tubular outer protective jacket 22 surrounding the metal shield 26. A pair of strength members 24 extend between the outer protective jacket 22 and the metal shield 26 on diametrically opposed sides of the cable. The ribbon stack 30 includes a plurality of fiber ribbons 32, each of which includes a plurality of optical fibers 34. The cable 20 has a central cable axis A-A that extends lengthwise through the cable 20 substantially down the center of the outer protective jacket 22. For clarity, the strength members 24, the shield layer 26 and the buffer tube 28 are not illustrated in the figures other than FIGS. 7 and 9. It will be appreciated that the cutaway of FIG. 7 is provided for purposes of explanation and the portion of the cable 20 extending through the system 100 is not severed or prepared as shown in FIG. 7.

Figure 5:
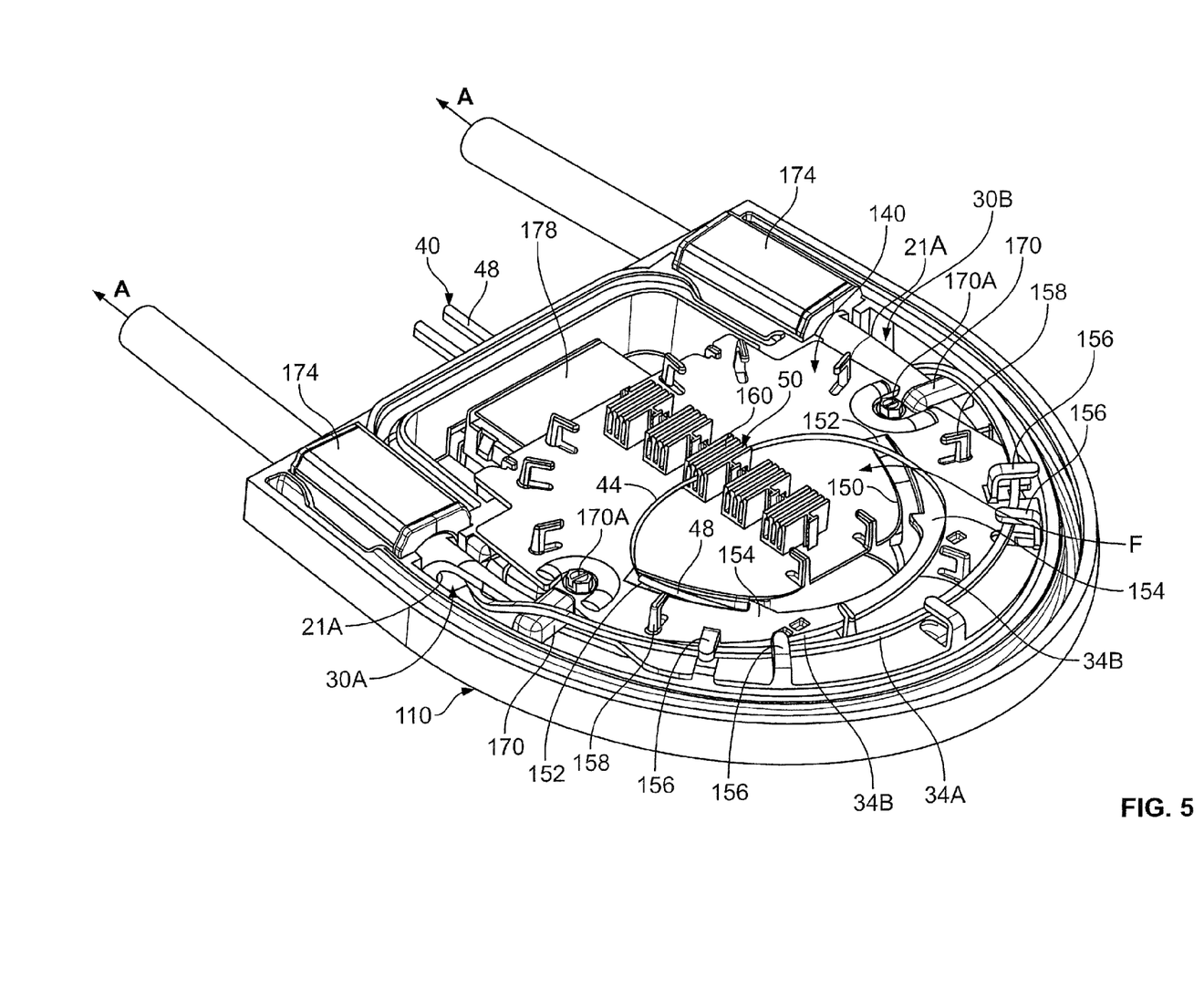
FIG. 5 is a top perspective view of the splice connection assembly of FIG. 1 with a cover thereof removed.

With reference to FIG. 5, each drop cable 40 may include an outer jacket, a buffer tube 48 extending longitudinally through the outer jacket, and one or more an optical fibers 44 extending through the buffer tube 48.

Figure 2:
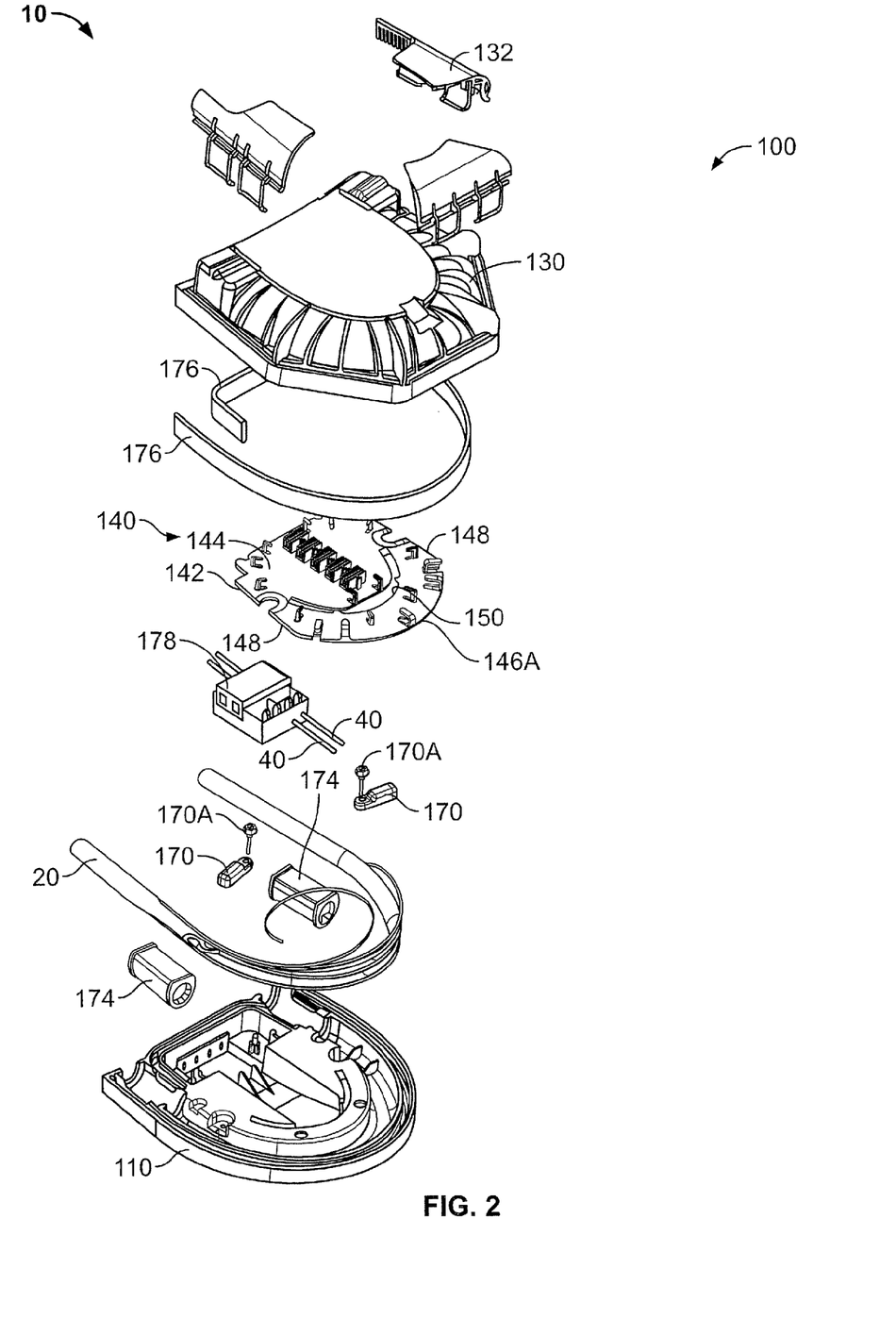
FIG. 2 is an exploded, front perspective view of the splice connection assembly of FIG. 1.

With reference to FIG. 2, the closure system 100 includes a base 110, a cover 130, clamps 132, an insert member or splice tray 140, cable clamps 170, main cable seal assemblies 174, perimeter sealing gaskets 176, and a drop seal assembly 178. The base 100 and the cover 130 together form an enclosure housing 102 defining a splice chamber 104 as seen in FIG. 4.

The illustrated multi-drop enclosure system 100 is a butt style enclosure where the main cable 20 enters and exits on a same side of the multi-drop closure system 100. The entry opening and exit openings for the main cable 20 are spaced apart from each other on the common side of the enclosure housing 102. The cover 130 can be moved between an open position allowing access for splicing optical fibers in the splice chamber 104 and a closed position extending over a splice access opening to the splice chamber 104 defined by the base 110. In the closed position, the interface between the base 110 and the cover 130 may be environmentally sealed so as to allow repeated access to the spliced chamber 104 while maintaining an environmentally sealed space for the splices 50 (FIG. 5) when the cover 130 is in the closed position. The cover 130 can be secured in the closed position by the clamps 132. It will be understood, however, that other re-enterable openings to the splice chamber allowing for environmental sealing thereof when the splice area is not being accessed may be used in some embodiments of the present invention.

Figure 6:
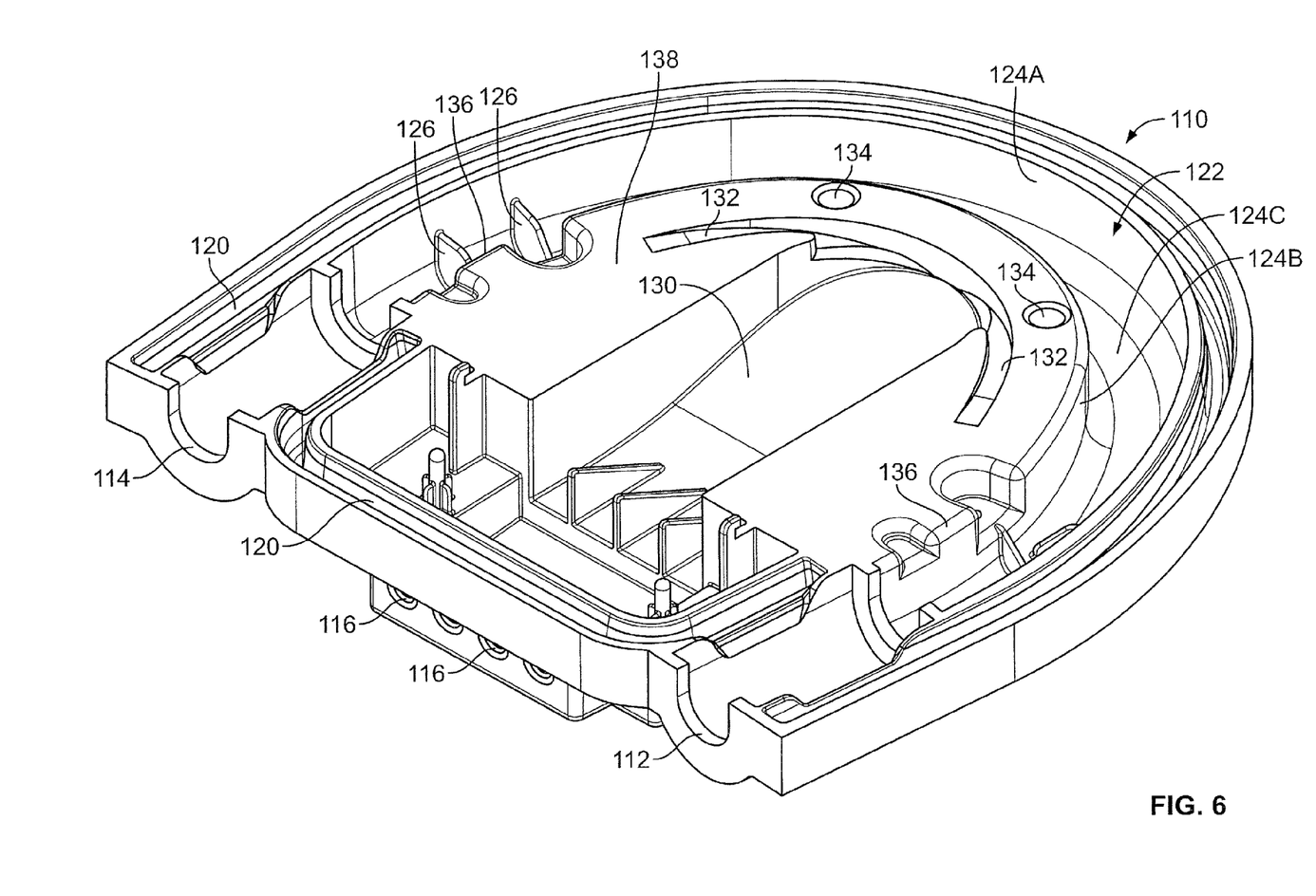
FIG. 6 is a top perspective view of a base forming a part of the splice connection assembly of FIG. 1.

With the reference to FIG. 6, the base 110 includes a main cable entry slot 112, a main cable exit slot 114, drop cable entry openings 116, and sealing gasket grooves 120. A main cable groove 122 is defined in the base 110 by an arcuate outer wall 124A, an arcuate inner wall 124B, and an arcuate bottom wall 124C. Upstanding tabs 126 extend into the groove 122. The inner wall 124B extends up to a platform 138. Opposed transition edges 136 between the inner wall 124B and the platform 138 may be configured with a smooth profile. A central ramp 130, a pair of arcuate, laterally extending ramp grooves 132, and tray coupling holes 134 are defined in the platform 138.

The tray 140 is mounted in the splice chamber 104 (FIG. 4) and secured to the base 110. With reference to FIGS. 2 and 5, the tray 140 has opposed top and bottom sides 142 and 144, an arcuate front edge 146A, and opposed side edges 148. An arcuate crescent-shaped slot 150 is defined in the tray 140 and has ramped ends 152. Integral stay tabs 154 extend into the slot 150. Express routing structures or tabs 156 and drop fiber routing structures or tabs 158 extend upwardly from the tray 140. Splice clips 160 are secured to the top of the tray 140.

The perimeter sealing gaskets 176 may be pre-installed in the cover 130 as seen in FIG. 3. When the cover 130 is closed onto the base 110, the gaskets 176 form an environmental seal about the splice chamber 104.

With reference to FIGS. 2, 4, 5 and 8-10, the closure system 100 may be used and the splice connection assembly 10 may be assembled in the following manner in accordance with some embodiments of the present invention. As seen in FIG. 9, the main cable 20 is scalloped in a section or segment 20A of the cable 20 to form elongate sideward openings 22A, 26A and 28A in the outer jacket 22, the shield layer 26 and the buffer tube 28, respectively (collectively, the openings 22A, 26A, 28A are referred to herein as the opening 21). The opening 21 extends to opposed ends 21A. The cable 20 and the scallop cut are oriented such the opening 21 is substantially parallel to the widths of the fiber ribbons 32 and a plane defined by the strength members 24 in the segment 20A. According to some embodiments, the strength members 24 are not fully or partially cut in the cable segment 20A. According to some embodiments and as illustrated, the outer jacket 22 and the strength members 24 are not fully severed in the cable segment 20A. According to some embodiments, none of the components 22, 24, 26, 28 are fully severed in the cable segment 20A and, therefore, a continuous segment of each component extends the full length of the opening 21. Suitable methods for scalloping the cable 20 to form the opening 21 may include those disclosed in U.S. Provisional Patent Application No. 60/966,301, filed Aug. 27, 2007 (Applicant's reference 5487-266PR) and U.S. patent application Ser. No. 12/194,178, filed Aug. 19, 2008 (Applicant's reference 5487-266), for example, the disclosure of which are incorporated herein by reference.

Figure 8:
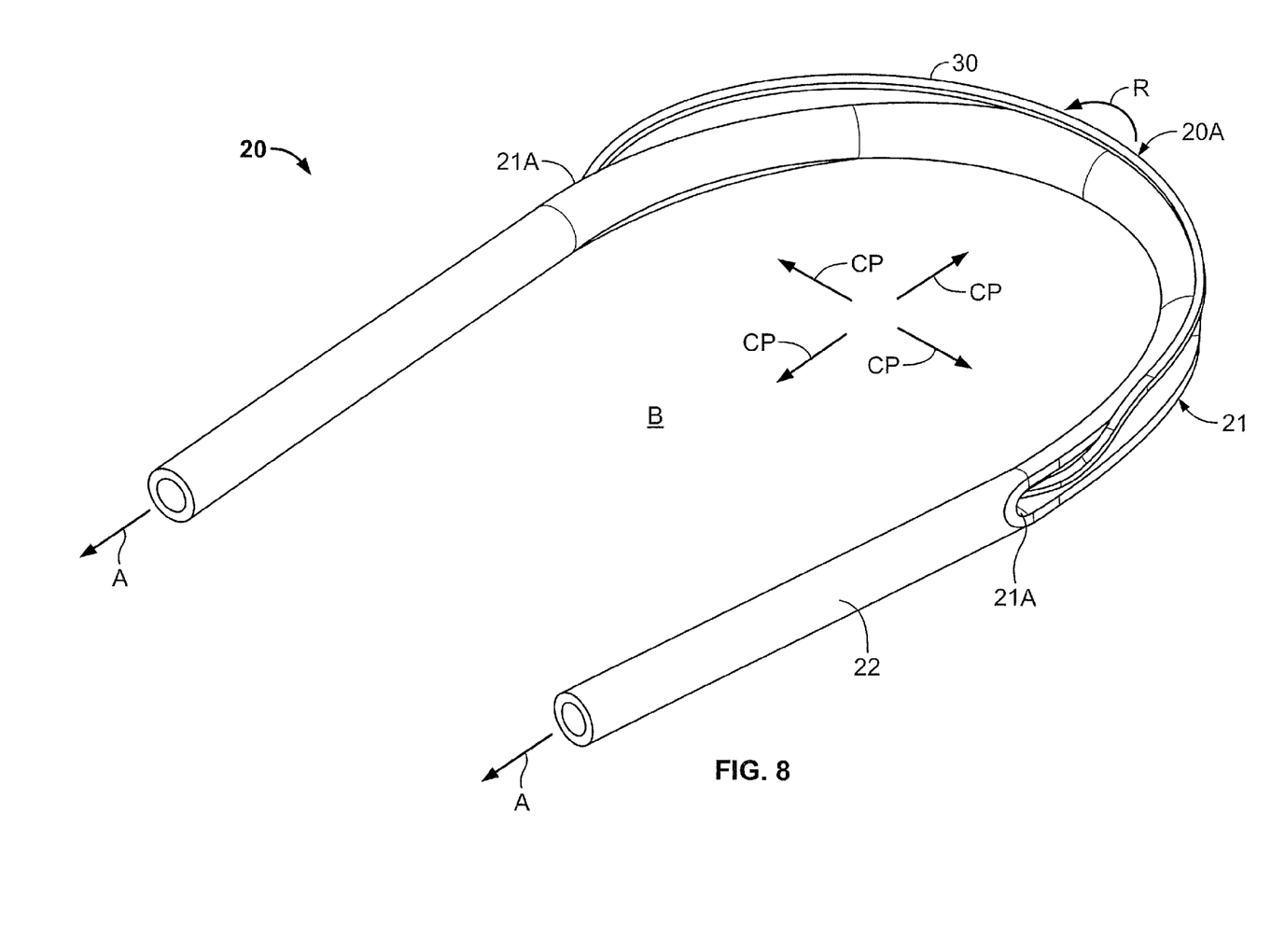
FIG. 8 is a rear perspective view of a bent cable segment of the fiber optic cable of FIG. 7.

The cable segment 20A is bent into an arc as shown in FIG. 8. However, the fiber ribbon stack 30 will remain in the outer jacket 22 and will be exposed through the opening 21. As discussed below, a segment of the cable stack 30 will be subsequently removed from the outer jacket 22. According to some embodiments, the cable segment 20A is bent as part of the procedure for cutting opening 21 and is retained in or returned to this position for subsequent installation in the closure system 100. According to some embodiments, the cable segment 20A is bent into an arc of at least 15 degrees, according to some embodiments, between about 15 and 180 degrees, according to some embodiments, between about 45 and 270 degrees, and according to some embodiments, substantially 180 degrees. However, other angles may be employed in some embodiments.

With reference to FIGS. 8 and 9, the portion of the cable axis A-A in the cable segment 20A defines a cable plane CP. According to some embodiments, the strength members 24 extend substantially parallel to the cable axis A-A and are laterally offset from the opening along an axis Q-Q that is transverse to the cable plane CP. According to some embodiments and as illustrated, the axis Q-Q is substantially orthogonal to the cable plane CP (i.e., the axis Q-Q is substantially parallel to the bend axis of the cable segment 20A). For the purpose of explanation, the strength members relatively arranged and configured in this manner may be referred to herein as vertically stacked or above and below one another and/or the opening 21; however, it will be appreciated that the cable plane CP may be reoriented so that the strength members are laterally stacked or alongside one another and/or the opening 21.

The arc of the bent cable segment 20A also defines an interior region B (FIG. 10) within the arc. As referenced herein, the interior region B includes a volume within, above and below the cable segment 20A (i.e., along an axis parallel to the orthogonal axis Q-Q (FIG. 9) but laterally bounded by the cable segment 20A).

One or more of the fibers 34 are then lifted up out of the cable 20 through the opening 21 and looped rearward or inward (as indicated by the arrow R in FIGS. 8 and 9) into a fiber handling region F in the interior region B inside the arc formed by the cable segment 20A as shown in FIG. 8. According to some embodiments, the fibers 34 are not axially withdrawn (pulled) from the cable 20 (i.e., along the cable axis A-A). Rather, the existing length of the fibers 34 present along the opening 21 is repositioned out of the jacket 22 without drawing a substantial amount of additional fiber length from the jacket 22. As illustrated in FIG. 5, substantially the entire segment of the ribbon stack 30 along the opening 21 may be removed from the jacket 22.

With reference to FIG. 5, the cable seal assemblies 174 are wrapped about the main cable 20 beyond the opening ends 21A. With the cover 130 and the tray 140 not yet installed over the base 110, the main cable 20 is then laid into the base 110 such that the cable seal assemblies 174 are received in the base 110 adjacent the slots 112, 114 (FIG. 3) and the bent cable segment 20A is received in the main cable groove 122. The opening 21 faces the outer wall 124A. The strength members 24 extend above and below the opening 21 (i.e., longitudinally and on opposed lateral sides of the cable 20). The fiber ribbons 32 are bent about an axis parallel to their width.

The tray 140 is then installed on the base 110 as shown in FIG. 5 and secured to the base 110 (e.g., by cooperating snap lock features or fasteners). As seen in FIG. 4, a front section 146 of the tray 140 overlies the bent cable segment 20A to at least partially close the top opening of the main cable groove 122, thereby collectively defining a cable channel 182 within which the bent cable segment 20A is disposed. The tray 140, being securely affixed to the base 110, serves to retain the bent cable segment 20A in the channel 182. The channel 182 can maintain the bent cable segment 20A in its arcuately bent configuration. The base 110 and the tray 140 also collectively define a central chamber 180 therebetween below the tray 140 and rearward (relative to cable entry and exit) of the channel 182. The segment of the ribbon stack 30 lifted out of the cable segment 20A resides over or on top of the tray 140. The fiber handling region F is disposed on the side of the tray 140 opposite the central chamber 180.

The cable 20 can be further secured in the base 110 by the cable clamps 170. As seen in FIGS. 2 and 3, each clamp 170 is inserted between the outer jacket 22 and the ribbon stack 30 and secured in place by a screw 170A. According to some embodiments, the clamps 170 are positioned proximate but forward of the opening ends 21A. The clamps 170 can engage and apply a load to the outer jacket 22 so that the outer jacket 22 is pinched or captured between each clamp 170 and a corresponding underlying and opposing set of the upstanding tabs 126 (FIG. 6). The clamps 170 can thereby serve as strain relief devices for the cable. The clamps 170 can also serve as separator devices to physically partition or isolate the ribbon stack 30 from the remainder of the cable 20. In particular, the clamps 170 can space the fibers 34 from the strength members 24 and other components of the cable 20 that might otherwise damage the fibers 34 during installation and/or in service. While clamps 170 are shown and described, fiber separator and cable strain relief structures of other configurations may be employed and the fiber separator and cable strain relief functions may be provided by separate structures.

The ribbon stack 30 is routed out of the remainder of the cable 20 and over the clamp 170 nearest the entry slot 112, over the clamp 170 nearest the exit slot 114, and back into the remainder of the cable 20. Between the clamps 170, fibers 34A that are not cut (referred to as express fibers) can be routed through the express routing tabs 156 as shown in FIG. 5. Partial or complete ribbons of express fibers 34A may be routed through the express routing tabs 156. According to some embodiments and as illustrated, portions of the expressed fibers 34A can be routed through or stored in the fiber handling region F.

When it is desired to terminate a drop cable 40 to a fiber 34 of the cable 20, the enclosure housing 102 is opened or retained in the open position to provide access to the tray 140. The drop cable 40 is trimmed and inserted through a drop entry opening 116 (FIG. 3) and the drop seal assembly 178. The buffer tube 48 is routed up through the central chamber 180 and bent laterally so that it extends though the slot 150 at an end 152 and is retained in position by the adjacent stay tab 154 as illustrated in FIGS. 4 and 5. The drop fiber 44 extends out of the buffer tube 48. Depending on its length, the exposed length of the drop fiber 44 may be looped and routed through the tabs 158 or may be routed directly (with a suitable bend radius) to a splice holder clip 160.

The installer also selects and severs a corresponding fiber 34B from a selected ribbon 32 from the ribbon stack 30. The cut fiber 34B is routed to the drop fiber 44 on the top side of the tray 140 and suitably spliced (e.g., fused or mechanically spliced) to the drop fiber 44 in the fiber handling region F. The splice 50 formed thereby may be mounted in the splice holder clip 160. The cut fiber 34B can be routed using the drop fiber routing tabs 158. Once the splice is completed, the cover 130 can be reinstalled to environmentally seal the splice.

In some cases, the installer may (at the time of the initial installation or subsequently) sever a fiber 34B and splice the fiber 34B as described above while leaving one or more of the other fibers of the ribbon 32 from which the fiber 34B is separated uncut (i.e., the remaining fibers of the ribbon 32 remain intact and are expressed).

The foregoing procedure can be used to splice additional drop cables 40 to the main cable 20. While the splice is described above with respect to a single drop fiber 44, the drop cable 40 may include multiple fibers that may be spliced to multiple ones of the main cable fibers 34, individually or as a mass splice. Multiple drop cables 40 may be spliced to the fibers 34.

Enclosure systems and methods according to the present invention can provide a number of advantages. The closure system 100 is a taut sheath closure, meaning no excess or slack fiber 34 is collected (e.g., looped) in the enclosure 102. Because the strength members 24 are not severed (i.e., the strength members 24 are expressed), the complexity and labor typically associated with securing the strength members to the enclosure can be obviated.

The enclosure systems and methods of the present invention can nonetheless provide sufficient loose fiber 34 length to enable effective handling and splicing of the fiber 34 to the drop fiber 44. More particularly, by repositioning or "flattening" the fiber 34 out of the cable segment 20A and into the interior region B defined within the arc of the cable outer jacket 22, the ratio of the length of the fiber 34 extending between the entry points 30A, 30B (FIG. 5) of the fiber 34 into the jacket 22 and the direct distance between the entry points 30A, 30B is increased and a corresponding amount of fiber slack is thereby created. Notably, this excess fiber length can be provided without withdrawing the fibers 34 axially from the cable 20 (i.e., without relying on the very limited fiber overlength within the cable 20). According to some embodiments, a lengthwise segment of the fiber ribbon stack 30 is removed in its entirety from the outer jacket 22 and the buffer tube 28. According to some embodiments and as illustrated, the entire fiber stack 30 is fully removed from bent cable segment 20A of the cable 20 between the clamps 170.

The ability to access and splice the fibers 34 without axially withdrawing substantial lengths of the fibers 34 from the cable 20 may be particularly advantageous. Often, only a single fiber 34 from one of the ribbons 34 must be severed and spliced. The remaining fibers 34 of that ribbon 32 must still be expressed. Therefore, those remaining, expressed fibers have no loose ends and it is beneficial to not have to pull the remaining, expressed fibers axially from the cable 20 to gain the ability to handle them. The very act of separating one or more fibers from a multi-fiber ribbon (e.g., a twelve fiber ribbon) necessitates that the ribbon be accessible for manual handling, but the expressed fibers in that ribbon cannot be substantially withdrawn axially from the cable.

Figure 10:
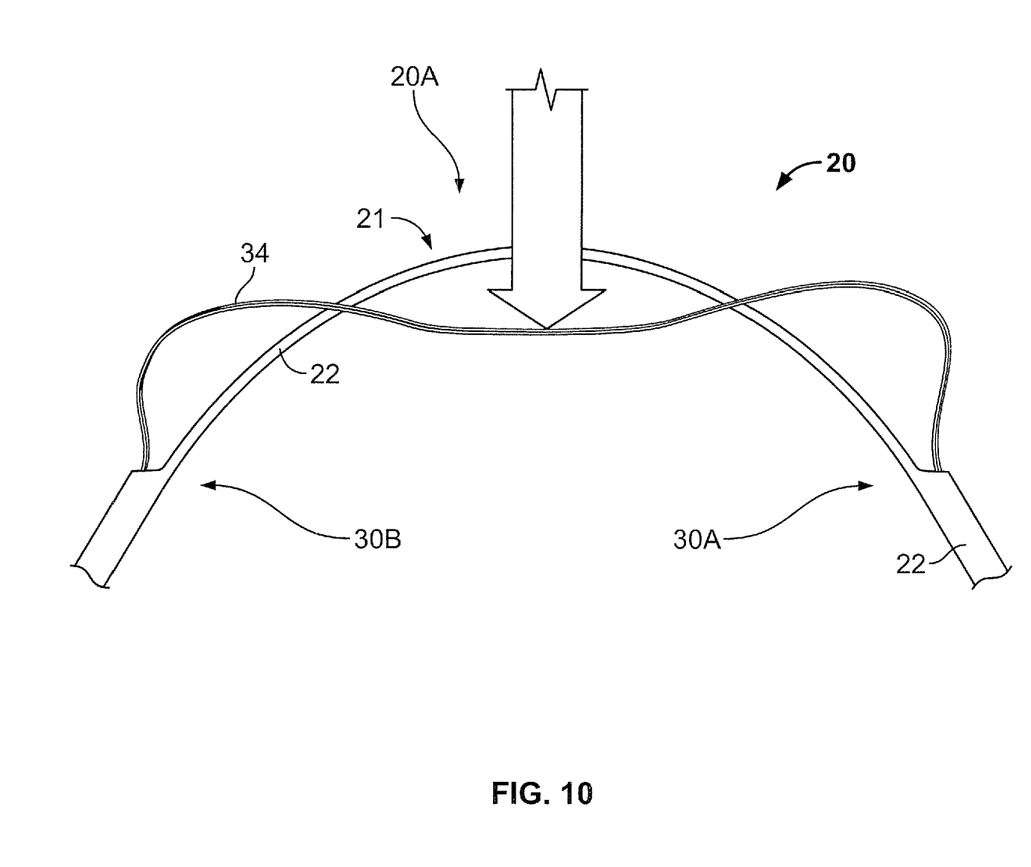
FIG. 10 is a top plan view of the bent cable segment of the fiber optic cable of FIG. 7 with optical fibers thereof displaced from a jacket of the fiber optic cable.
Figure 11:
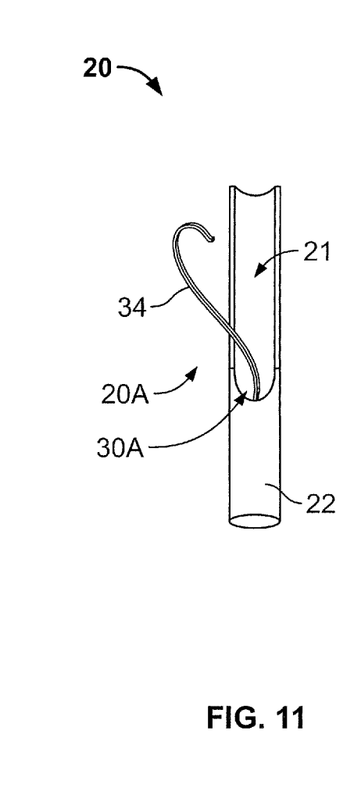
FIG. 11 is a side elevational view of the bent cable segment of the fiber optic cable of FIG. 7 with the optical fibers displaced from the jacket.

The flattening of the fibers 34 can also serve to direct the portions of the fibers 34 proximate the opening ends 21A laterally outwardly away from the cable 20 as schematically illustrated in FIGS. 10 and 11. In this manner, the risk of impingement on the fibers 34 by the other elements of the cable 20 can be reduced. Also, this routing of the fibers 34 may provide a smoother fiber path.

According to some embodiments and as illustrated in FIGS. 4 and 9, the enclosure system 100 positions the repositioned fibers 34 in a fiber handling plane TP that is spaced apart from the cable plane CP (i.e., the fiber handling region F is both in the interior region B and in the fiber handling plane TP spaced apart from the cable plane CP). The cable plane CP is the plane defined by the axis A-A of the cable 20 in the bent cable segment 20A. According to some embodiments, the expressed fibers 34A (i.e., the expressed ribbon stack) are repositioned to extend within the fiber handling plane TP so that the segments of the expressed fibers 34A from the opening 21 are stored in a plane other than the cable plane CP. According to some embodiments, the fiber splices 50 are also located in the fiber handling plane TP. According to further embodiments, the expressed fibers 34A are stored in the fiber handling plane TP and the fiber splices 50 are located in a third plane different from the cable plane CP and the fiber handling plane TP in which the express fibers 34A are stored.

According to further embodiments, the cable opening 21 is positioned on the inside of the bent cable segment 20A (i.e., the cable 20 is bent in the opposite direction from that shown in FIG. 8). The fibers 34 may be pulled outwardly into the interior region defined within the bent cable segment and flattened as discussed above to provide excess fiber length. The fibers 34 may be positioned in the same plane as the cable plane CP or may be placed in a different plane as discussed above. This configuration may be particularly desirable if the angle of entry of the cable 20 into the enclosure housing 102 is relatively wide (e.g., in the case of a banana-shaped enclosure) as it would provide additional fiber length into the fiber handling region of the enclosure.

While an inverted U-shaped butt style enclosure is illustrated herein, other embodiments of the invention may instead employ an enclosure wherein the bent cable segment is bent at a wider angle and the enclosure has a corresponding shape (e.g., banana-shaped).

While the enclosure systems and methods have been described above with reference to a cable 20 having ribbonized fibers 34, the closure systems and methods of the present invention can be used with cables having non-ribbonized fibers, more or fewer fiber ribbons, more or fewer fibers and/or other variations of fiber optic cables.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed:

1. A fiber optic connection assembly comprising:
    an enclosure housing defining a chamber and a fiber handling region disposed in the chamber;
    a fiber optic cable having a lengthwise cable axis and including a plurality of cable optical fibers, a jacket surrounding the cable optical fibers and a strength member extending through the jacket, the cable including an arcuately bent cable segment disposed in the chamber, wherein:
        the bent cable segment defines a cable plane and an interior region within the arc of the bent cable segment;
        at least one of the cable optical fibers extends fully through the enclosure housing uncut;
        the strength member extends fully through the enclosure housing uncut;
    wherein the fiber handling region is disposed in the interior region; and
    wherein at least one of the cable optical fibers is removed from the bent cable segment and routed into the fiber handling region where at least a portion of the removed cable optical fiber is stored and/or spliced to another optical fiber.

2. The fiber optic cable connection assembly of claim 1 wherein the fiber handling region is located in a fiber handling plane spaced apart from the cable plane.

3. The fiber optic cable connection assembly of claim 1 wherein:
    the jacket extends fully and continuously through the enclosure housing; and
    the jacket includes a longitudinally extending access opening in the bent cable segment and in the chamber and through which the cable optical fibers exit the jacket.

4. The fiber optic cable connection assembly of claim 3 wherein the access opening faces in a direction opposite the interior region.

5. The fiber optic cable connection assembly of claim 1 including a secondary optical fiber extending into the chamber, wherein the removed cable optical fiber is routed out of the bent cable segment and spliced with the secondary optical fiber in the fiber handling region.

6. The fiber optic cable connection assembly of claim 5 including a splice retainer structure in the fiber handling region to hold a splice between the removed cable optical fiber and the secondary optical fiber.

7. The fiber optic cable connection assembly of claim 6 wherein the splice retainer structure includes a splice tray located above the cable plane.

8. The fiber optic cable connection assembly of claim 7 wherein:
    the enclosure housing and the splice tray define a subchamber therebetween;
    the cable plane extends through the subchamber; and
    the secondary optical fiber extends through the subchamber and onto a side of the splice tray opposite the subchamber where the secondary optical fiber is spliced with the removed cable optical fiber.

9. The fiber optic cable connection assembly of claim 1 wherein the removed cable optical fiber is an express optical fiber extending fully through the enclosure housing uncut.

10. The fiber optic cable connection assembly of claim 1 including routing features in the enclosure housing defining a prescribed cable arc path and configured to retain the bent cable segment such that the bent cable segment extends along the cable arc path.

11. The fiber optic cable connection assembly of claim 10 wherein the cable arc path has an arc path radius that is equal to or exceeds a prescribed minimum bend radius of the cable optical fibers.

12. An enclosure system for use with a fiber optic cable and a secondary fiber, the cable having a lengthwise cable axis and including a plurality of cable optical fibers, a jacket surrounding the cable optical fibers and a strength member extending through the jacket, the enclosure system comprising:
   an enclosure housing defining a chamber to receive the cable;
   routing features in the enclosure housing defining a prescribed cable arc path and configured to retain an arcuately bent cable segment such that the bent cable segment extends along the cable arc path, wherein the bent cable segment includes an uncut length of the strength member, the bent cable segment defining a cable plane and an interior region within the bent cable segment; and
   a fiber handling region disposed in the chamber in the interior region;
   wherein at least one of the cable optical fibers can be removed from the bent cable segment and routed into the fiber handling region to store at least a portion of the removed cable optical fiber in the fiber handling region and/or to splice the removed cable optical fiber with another optical fiber.

13. The enclosure system of claim 12 wherein the fiber handling region is located in a fiber handling plane spaced apart from the cable plane.

14. The enclosure system of claim 12 including a splice retainer structure in the fiber handling region to hold a splice between the removed cable optical fiber and a secondary optical fiber.

15. A method for enclosing a portion of a fiber optic cable, the cable having a lengthwise cable axis and including a plurality of cable optical fibers, a jacket surrounding the cable optical fibers, and a strength member extending through the jacket, the method comprising:
   providing an enclosure housing defining a chamber and a fiber handling region disposed in the chamber;
   positioning an arcuately bent cable segment of the cable in the chamber, wherein:
      the bent cable segment defines a cable plane and an interior region within the bent cable segment;
      at least one of the cable optical fibers extends fully through the enclosure housing uncut;
      the strength member extends fully through the enclosure housing uncut;
      the fiber handling region is disposed in the interior region;
   removing at least one of the cable optical fibers from the bent cable segment;
   routing the removed cable optical fiber into the fiber handling region; and
   storing at least a portion of the removed cable optical fiber in the fiber handling region and/or splicing the removed cable optical fiber with a secondary optical fiber in the fiber handling region.

16. The method of claim 15 wherein the fiber handling region is located in a fiber handling plane spaced apart from the cable plane.

17. The method of claim 15 including:
   providing a splice retainer structure in the splice region to hold a splice between the selected cable optical fiber and the secondary optical fiber, the splice retainer structure including a splice tray located above the cable plane, wherein the enclosure housing and the splice tray define a subchamber therebetween and the cable plane extends through the subchamber;
   routing the secondary optical fiber through the subchamber and onto a side of the splice tray opposite the subchamber; and
   splicing the secondary optical fiber with the selected cable optical fiber on the side of the splice tray opposite the subchamber.

18. The method of claim 15 wherein:
   the jacket extends fully and continuously through the enclosure housing when the bent cable segment is positioned in the enclosure housing;
   the jacket includes a longitudinally extending access opening in the bent cable segment; and
   removing the at least one cable optical fiber from the bent cable segment includes removing the removed cable optical fiber from the bent cable segment through the access opening.

19. The method of claim 15 wherein positioning the arcuately bent cable segment of the cable in the chamber includes positioning the arcuately bent cable segment of the cable in the chamber such that the access opening of the cable faces in a direction opposite the interior region.

20. The method of claim 15 including, prior to positioning the arcuately bent cable segment of the cable in the chamber, removing a scalloped segment of the jacket to form the access opening.

* * * * *